(No Model.)
H. E. FULLER.
SIFTER FOR FLOUR, &c.
No. 310,405. Patented Jan. 6, 1885.
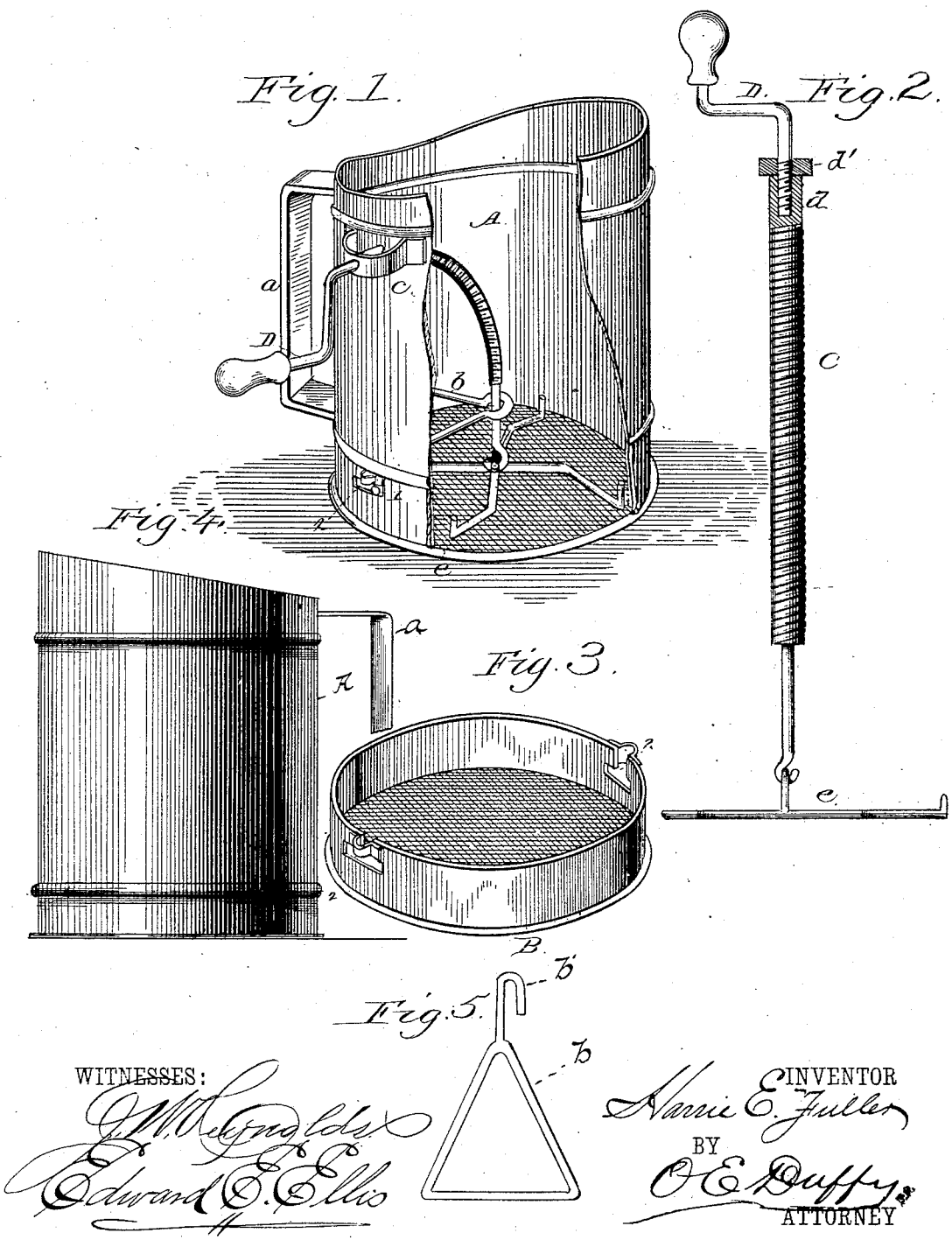

UNITED STATES PATENT OFFICE.

HARRIE E. FULLER, OF FREDONIA, KANSAS.

SIFTER FOR FLOUR, &c.

SPECIFICATION forming part of Letters Patent No. 310,405, dated January 6, 1885.

Application filed September 4, 1884. (No model.)

*To all whom it may concern:*

Be it known that I, HARRIE E. FULLER, of Fredonia, in the county of Wilson and State of Kansas, have invented certain new and useful Improvements in Sifters for Flour and other Substances; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to devices for sifting flour, meal, and other substances, and for straining fruit, &c., the same being designed more especially for household use, although it may be employed upon a much larger scale than that represented by the accompanying drawings.

The invention consists in such details of construction and combinations of parts as will hereinafter be distinctly described, and pointed out in the claims.

By the construction and arrangement of parts serving to constitute the within device the same is reduced to a minimum of simplicity, the parts are less tiresome to operate, and are readily separable for cleansing and repair, their durability is enhanced, and their wear by friction rendered slight, thereby providing a most complete and useful apparatus for kitchen as well as other uses.

Referring to the accompanying drawings, Figure 1 represents in perspective, partly broken away, a view of my improved device. Fig. 2 represents a view of the flexible shaft, operating-crank, and the stirrers or agitators as they are connected to each other. Fig. 3 is a view in detail of the separable sieve or bottom. Fig. 4 is a side view of the vessel or receptacle as when employed without the removable sieve portion, and Fig. 5 is a view in detail of the brace or stay for the flexible shaft.

In constructing my device I prefer to employ a vessel or receptacle, A, of circular contour, and to provide the same with a suitable handle, $a$, by which it may be lifted. I prefer that the reticulated bottom or sieve B shall be stationary; but, as represented in Fig. 1, the same is shown to be separable or removable, the receptacle being provided at diametrically-opposite sides of its wall, near the bottom edge, with projecting lugs or pins 1 1, which form a bayonet-joint with the angular slots 2 2 of the bottom.

Secured to and projecting from the wall of the vessel, within, is a wire brace or stay, which may be of any desired shape, but is preferably of the form shown in Fig. 5, wherein it has a triangular shape terminating in the hooked portion $b'$, although in Fig. 1 this brace or stay is formed without the hooked portion having its angle or extremity circularly bent, as shown, and situated at about the center of and just above the sieve. At the upper side of the vessel, without, is attached or secured a bracket or bent arm, $c$.

The bracket or stay $b$ is for guiding and maintaining centrally within the vessel the lower end of a spring or flexible shaft, C, through which circular motion is imparted to the agitators; and the bracket $c$ constitutes, in addition to the wall of the vessel itself, a bearing for the operating handle or crank D, to which the upper end of the flexible shaft is connected by a screw-threaded sleeve or coupling, $d$. (See Fig. 2.) By unscrewing the crank D it can be detached from the shaft C, and the latter can be slipped out of the brace $b$ for cleaning or other purposes. The shaft C is of such length that when properly situated or placed within the vessel it will be made to assume a bent or curved form in the direction of its length, as shown in Fig. 1. This bent or curved form gives it elasticity in yielding up and down to any irregularity caused by the contents of the vessel, and regulates the pressure of the stirrers upon the sieve to the amount of flour or other substance being sifted. The lower end or extremity of this shaft consists of a straight piece, which may be either separate and suitably attached or secured, or it may be a prolongation of the spring itself. To the end of this portion are attached by hook or link connections the stirrers $e$, which tend in their movement to keep the flour or other substance constantly agitated, by which a thorough sifting is effected.

Between the inner side of the receptacle and the upper end of the flexible shaft, on the operating-crank, I locate leather, cork, or other suitable washers, $d'$, to overcome the noise and wear produced by friction, and to regulate the pressure of agitators upon the sieve according to the number of washers employed.

It will be observed by the construction herein described that the parts may all be taken apart for cleansing, and that any part, when worn, can be readily replaced by another.

The advantage possessed by having the bottom removable is that sieves of varying degrees of fineness may be employed; but for all general purposes the stationary bottom will be found sufficient.

The operation is as follows: The receptacle is first supplied with the flour or other substance to be sifted, and the crank D then turned. The motion thus imparted gives movement to the spring, which in turn revolves the stirrers. It will be seen that I obtain a horizontal rotation of the agitators through the medium of a crank operated in a vertical plane without the employment of intermediate gearing to effect this end.

Experience has demonstrated the fact that it is easier and less tiresome to operate a crank in a vertical plane of rotation than in a horizontal plane; hence the advantage possessed by my device in gaining the results stated without the use of cogs, &c. The stirrers are rotated once to a single rotation of the crank. Further, I dispense with bearings in the bottom for the stirrer-shaft, usually employed in this class of devices, the said shaft being maintained truly central by the inner projecting stay or brace, $b$.

It will be obvious that the above arrangement of parts can be reversed and the crank made to operate in a horizontal plane, while the plane of movement of the stirrers will be in a plane at right angles thereto, or vertical.

Having thus described my invention, what I claim is—

1. In a sifting device for flour and other substances, the combination of a vessel or receptacle having a reticulated bottom, stirrers or agitators, an operating-crank, and a flexible shaft connecting said stirrers and crank, whereby the latter, turning in a vertical plane, operates the former in a plane horizontal or at right angles thereto, substantially as described.

2. The combination of the vessel A, having removable reticulated bottom, the bracket $c$, and an inwardly-extending guide or brace, the crank, the spring or flexible shaft C, connected at its upper end to said crank, and terminating at its lower end with a straight portion, as shown, and the stirrers $e$, connected to said straight portion, substantially as described.

3. The herein-described sifter, comprising the receptacle having at its bottom diametrically-opposite lugs, the sieve portion B, provided with angle-slots corresponding to said lugs, stirrers $e$, spring-shaft C, having screw-threaded sleeve at its upper end, and crank D, secured in said sleeve, and bearing one or more elastic washers, substantially as and for the purpose set forth.

4. The combination of the vessel A, having reticulated bottom, the bracket $c$, and the brace or stay $b$, extending from the side of the receptacle, within, and formed with the hooked portion, the spring or flexible shaft, the stirrers attached to the lower end of said shaft by a hook or link connection, and the removable operating-crank, all substantially as described.

In testimony that I claim the foregoing as my own I affix my signature in presence of two witnesses.

HARRIE E. FULLER.

Witnesses:
JOHN W. KIMBREL,
HENRY W. BUCK.